E. J. SMITH.
HOOK FASTENER.
APPLICATION FILED MAR. 3, 1915.

1,245,521.

Patented Nov. 6, 1917.

WITNESSES:
René Bruine
Gustave R. Thompson

INVENTOR:
Elizabeth J. Smith
By Attorneys,
Fraser Tink & Myers

UNITED STATES PATENT OFFICE.

ELIZABETH JANE SMITH, OF LARCHMONT, NEW YORK.

HOOK-FASTENER.

1,245,521.  Specification of Letters Patent.  Patented Nov. 6, 1917.

Application filed March 3, 1915. Serial No. 11,657.

*To all whom it may concern:*

Be it known that I, ELIZABETH J. SMITH, a citizen of the United States of America, residing in Larchmont, in the county of Westchester and State of New York, have invented certain new and useful Improvements in Hook-Fasteners, of which the following is a specification.

This invention relates to hook fasteners and aims to provide improvements therein.

In the manufacture of hook fasteners from sheet-metal it sometimes happens that the metal is not properly tempered, and as a consequence, the hooks are weak at the bend, and liable to break in use.

By the present invention a hook is provided wherein less care in tempering, and a less degree of temper, is required, wherein the proper regidity of the hook is insured, and whereby practically all likelihood of the hook breaking at the bend under conditions of ordinary use is eliminated.

By the present invention the hook may also be provided with a hump or projection for resisting the disengagement of an eye member, when engaged by the hook.

Other features of importance and advantage will be hereinafter set forth.

An embodiment of the invention is illustrated in the accompanying drawing, wherein—

Figure 1:
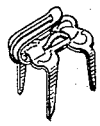
Figure 1 is a perspective view of the fastener.
Figure 2:
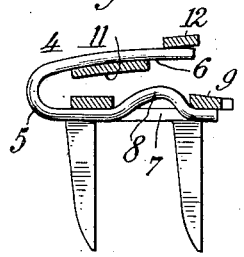
Fig. 2 is a longitudinal section thereof.
Figure 3:
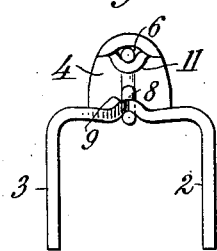
Fig. 3 is a rear-end view thereof.
Figure 4:
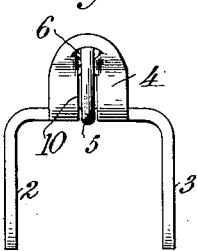
Fig. 4 is a front-end view thereof.
Figure 5:
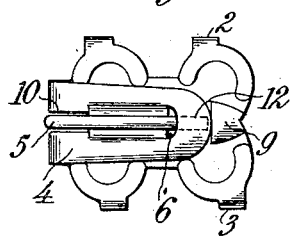
Fig. 5 is a top-plan view thereof.
Figure 6:
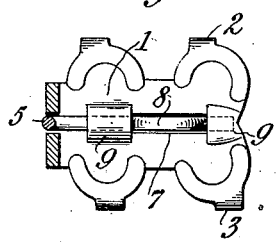
Fig. 6 is a horizontal sectional view thereof.
Figure 7:
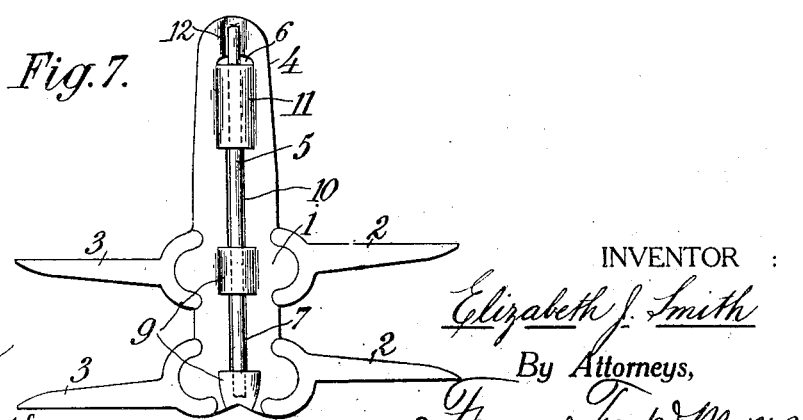
Fig. 7 is a view of the fastener flattened out.

In said drawings numeral 1 designates the body of the fastener, preferably of sheet-metal, and preferably having attaching prongs 2 2, 3 3, formed integral therewith. A bill portion 4 is also preferably formed integral with the body.

The bill of the hook is strengthened by means of a wire 5. The wire 5 renders the hook rigid, especially at the bend, less rigidity in the material of the hook therefore being required, and the hook may therefore be of less thickness, and less highly tempered.

The wire may be attached to the hook in any suitable manner. The wire preferably surrounds the hook on the outside, and the bill and body of the hook may be provided with slots 6 and 7 for retaining the ends of the wire. The wire is preferably provided with a humped or inwardly bent portion 8, which projects through the slot 7 on the body of the fastener and constitutes a "hump" or projection for retarding the separation of the eye which is in engagement with the hook.

The underside of the body is preferably depressed at 9 to receive the wire so that the underside of the body may be substantially flat or flush. This is of importance in pronged-fasteners as it enables the prongs to press and clasp the goods flat against the underside of the fastener. If desired, the bill may be cut out at 10, at the bend, to receive the wire. The upper side of the bill is preferably depressed at 11, so that the wire will lie substantially flush on the upper side of the bill, and the end of the bill may be bossed at 12 to receive the end of the wire.

The prongs are preferably staggered, as shown, to facilitate the bending of the prongs to a position flat upon the goods without overlapping.

While I have illustrated one embodiment of the invention, the invention is not to be understood as limited thereto, as the inventive idea may receive a variety of mechanical expressions.

What is claimed is:—

1. A hook fastener, having a bill of sheet material having a bend therein and a wire reinforcement around said bend.

2. A hook fastener, having a body and bill of sheet material, having a bend therein, said bill having a stiff wire reinforcement around said bend.

3. A hook fastener, having a body and bill of sheet material having a bend therein, said bill having a stiff wire reinforcement around said bend, said body having fastening means thereon on each side thereof.

4. A hook fastener, having a body and bill of sheet material, said bill having a bend and a wire reinforcement around said bend, said body having a depression on its underside for receiving said wire, whereby said body has a substantially flat or flush underside.

5. A hook fastener, having a body and bill of sheet material, said bill having a wire reinforcement, said body having fastening prongs thereon and a depression on its underside for receiving said wire, whereby said body has a substantially flat or flush underside, and whereby said prongs, when bent over, may press and clasp goods flat against said underside of said body.

6. A hook fastener, having a bill of sheet material having a bend therein and a wire reinforcement around said bend, said bill being provided with a depression to receive said wire.

7. A hook fastener, having a body and bill of sheet material, a wire reinforcement, and said wire having a bend therein adapted to form a "hump" or projection for preventing separation of an eye when engaged with said hook.

8. A hook fastener, having a body and bill of sheet material, said bill having a wire reinforcement, said bill having a slot at its bend within which said wire fits, said body having a slot therein, and said wire having a bend therein adapted to project through said slot and to form a "hump" or projection for preventing separation of an eye when engaged with said hook.

In witness whereof, I have hereunto signed my name in the presence of two subscribing witnesses.

ELIZABETH JANE SMITH.

Witnesses:
GUSTAVE R. THOMPSON,
CHAS. LYON RUSSELL.

Copies of this patent may be obtained for five cents each, by addressing the "Commissioner of Patents, Washington, D. C."